Oct. 7, 1930.  V. DAHL  1,777,660
MACHINE FOR MAKING CONCRETE BLOCKS AND THE LIKE
Filed March 13, 1928   11 Sheets-Sheet 1

Inventor
Valentine Dahl
By his Attorneys
Cooper, Kerr & Dunham

Oct. 7, 1930. V. DAHL 1,777,660
MACHINE FOR MAKING CONCRETE BLOCKS AND THE LIKE
Filed March 13, 1928 11 Sheets-Sheet 2

FIG. 6

Inventor
Valentine Dahl
By his Attorneys
Cooper, Kerr & Dunham

Oct. 7, 1930.  V. DAHL  1,777,660
MACHINE FOR MAKING CONCRETE BLOCKS AND THE LIKE
Filed March 13, 1928   11 Sheets-Sheet 3

FIG. 7.

Inventor
Valentine Dahl
By his Attorneys
Cooper, Kerr & Dunham

Oct. 7, 1930.  V. DAHL  1,777,660
MACHINE FOR MAKING CONCRETE BLOCKS AND THE LIKE
Filed March 13, 1928    11 Sheets-Sheet 4

Inventor
Valentine Dahl
By his Attorneys
Cooper, Kerr & Dunham

Oct. 7, 1930.  V. DAHL  1,777,660
MACHINE FOR MAKING CONCRETE BLOCKS AND THE LIKE
Filed March 13, 1928   11 Sheets-Sheet 5

FIG. 9.

Inventor
Valentine Dahl
By his Attorneys
Cooper, Kerr & Dunham

Oct. 7, 1930.    V. DAHL    1,777,660
MACHINE FOR MAKING CONCRETE BLOCKS AND THE LIKE
Filed March 13, 1928    11 Sheets-Sheet 6

FIG. 10.

Inventor
Valentine Dahl
By his Attorneys
Cooper, Kerr & Dunham

Oct. 7, 1930.  V. DAHL  1,777,660
MACHINE FOR MAKING CONCRETE BLOCKS AND THE LIKE
Filed March 13, 1928  11 Sheets-Sheet 11

Inventor
Valentine Dahl
By his Attorneys
Cooper, Kerr & Dunham

Patented Oct. 7, 1930

1,777,660

UNITED STATES PATENT OFFICE

VALENTINE DAHL, OF WOODHAVEN, NEW YORK

MACHINE FOR MAKING CONCRETE BLOCKS AND THE LIKE

Application filed March 13, 1928. Serial No. 261,250.

This invention pertains to machines for making compressed articles of plastic material, such as concrete building blocks or hollow tile.

An object of the invention is to so improve the design and arrangement of a machine of that class as to greatly enhance the convenience of operation and efficiency thereof.

Another object is to provide such an arrangement of parts and method of operation as will produce an improved product.

Further and other objects and advantages will be hereinafter set forth in the accompanying specification and claims, and shown in the drawings, which by way of illustration show what is now considered to be the preferred embodiment of the invention.

Figure 6:
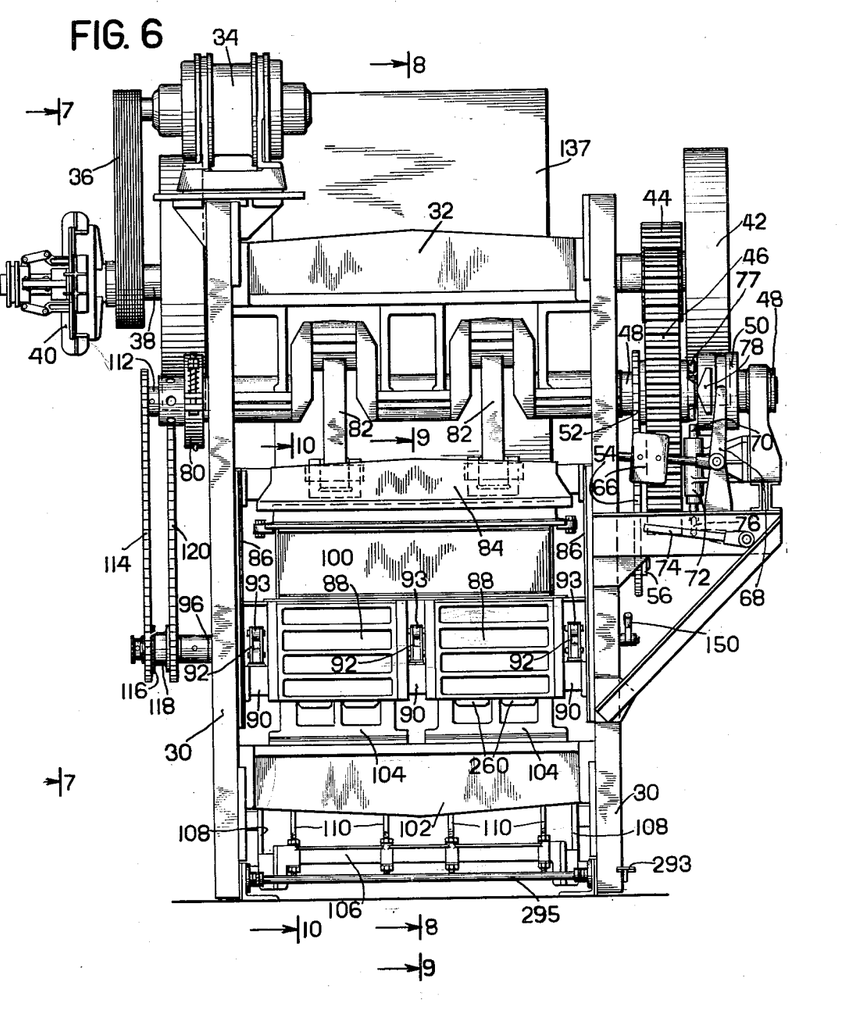
Fig. 6 is a front elevation of the machine with some unimportant details omitted.
Figure 7:
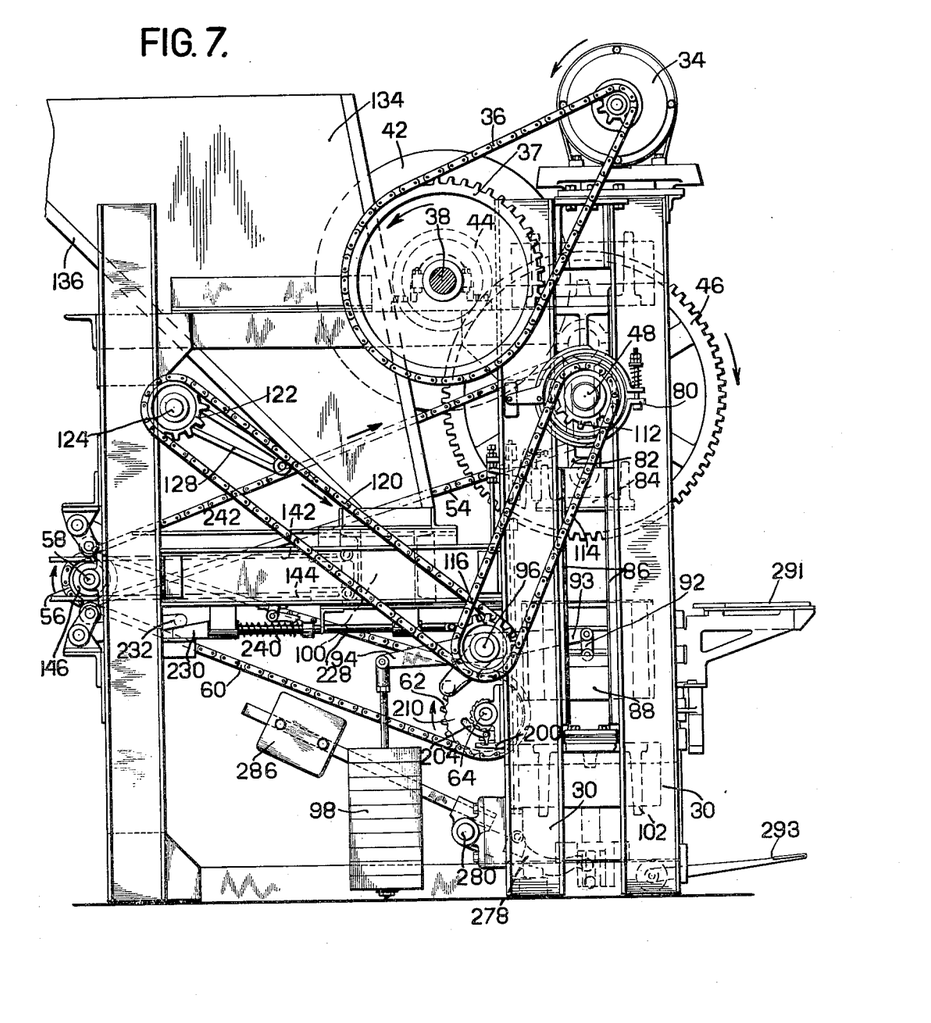
Fig. 7 is a view on the line 7—7 of Fig. 6.

Referring to Figs. 6 and 7, the front frame of the machine includes upright channels 30 tied together at their upper ends by member 32. Mounted on top of the members 30 is a motor 34 driving by means of chain 36 a sprocket 37 on shaft 38. The sprocket turns freely on the shaft until friction clutch 40 is engaged, whereupon shaft 38 is driven by the motor. Fast on shaft 38 are a flywheel 42 and a pinion 44. Pinion 44 is in mesh with gear 46 which rotates freely on crank shaft 48 until clutch sleeve 50, splined on shaft 48, is moved to the left, whereupon crank shaft 48 rotates in unison with gear 46. Attached to the hub of gear 46 is a sprocket 52, which through chain 54 drives sprocket 56 fast on shaft 58. Another sprocket fast on shaft 58, through chain 60, drives sprocket 62, which is normally free to rotate on vibrator shaft 64.

Weight 66 (Fig. 6) on bell crank 68 constantly urges clutch sleeve 50 toward the left, but movement of the sleeve in that direction is normally prevented by pin 70 supported for vertical movement in bracket 72. Hand lever 74 is connected by link 76 to the lower end of pin 70 so that when lever 74 is depressed pin 70 is lowered out of engagement with sleeve 50, thereby permitting weight 66 to move member 50 to the left until teeth 77 on the hub of gear 46 are engaged by corresponding teeth in sleeve 50, whereupon crank shaft 48 rotates in unison with gear 46.

On the outer surface of member 50 is a cam 78. When sleeve 50 approaches the end of its first revolution in its left hand (engaged) position cam 78 contacts with the side of the upper end of pin 70 and moves member 50 to the right until pin 70, urged upwardly by a spring (not shown) again assumes the position shown in Fig. 6, holding clutch 50 out of engagement. From the above it will be understood that whenever lever 74 is depressed, crank shaft 48 makes one revolution only and then comes to rest. A friction brake 80 of usual type is provided at the left end of crank shaft 48 to prevent the shaft overrunning at the end of its revolution after clutch 50 is disengaged.

Shaft 48 is provided with two cranks, from each of which depends a connecting rod 82, the lower ends of which are connected to ram 84, mounted for vertical reciprocation on guides 86 on frame uprights 30.

The machine illustrated in the drawings is designed to make two blocks simultaneously; therefore two molds 88 are provided, mounted end to end on frame 90 which is arranged to reciprocate vertically on the same guides 86 upon which ram 84 is guided.

Frame 90 is supported by three sets of links 92 hanging from the ends of three arms 93 keyed to horizontal shaft 96. From similar arms 94 extending rearwardly, hang weights 98 (Fig. 7) of greater mass than the molds and their attached parts.

Above molds 88 and below ram 84 in its elevated position, is a space into which a hopper 100 moves periodically for the purpose of charging the molds.

Below the molds and rigidly attached to the frame of the machine is a fixed member 102 which supports the plungers 104.

Below 102 in Fig. 6 is seen the ejector frame 106, arranged to reciprocate vertically on guides 108. Extending upwardly from frame 106 are the ejector rods 110, adjustably mounted in slots 111 (Fig. 10) through frame 106 and guided by vertical holes through plungers 104.

With the above preliminary description in mind the details of construction and operation will be readily understood.

Figure 8:
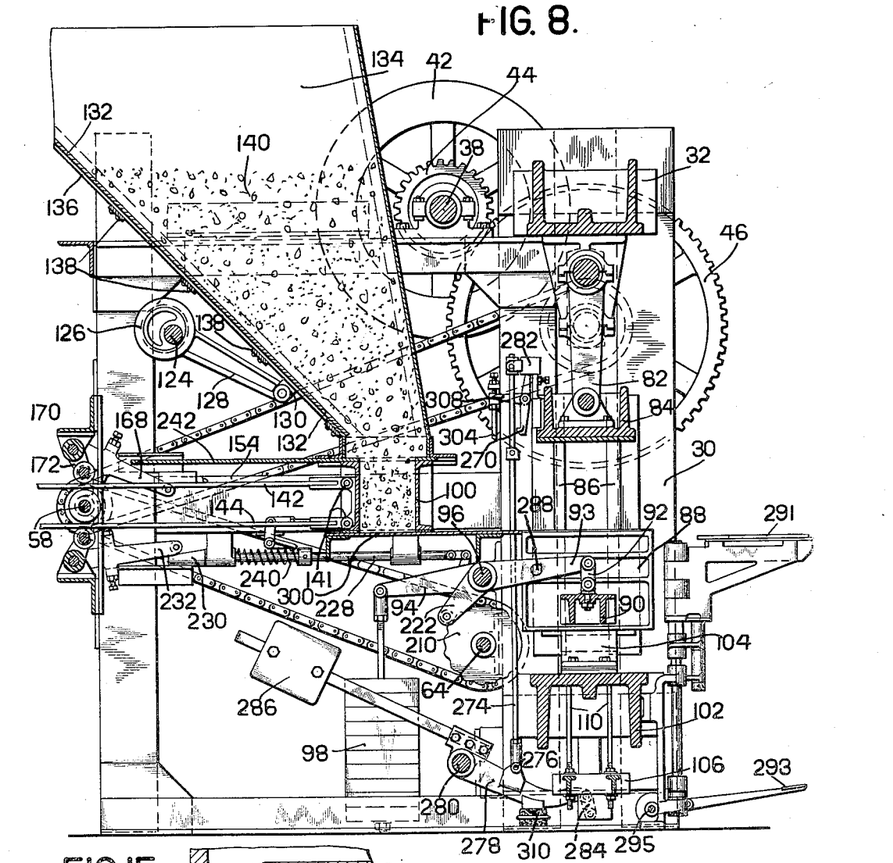
Fig. 8 is a sectional view on the line 8—8 of Fig. 6.

On the left end of crank shaft 48 (Fig. 6) is a sprocket 112 (Fig. 7) which through chain 114 drives sprocket 116, free to rotate on the end of shaft 96. Attached to sprocket 116 and rotating therewith is sprocket 118, which, through chain 120, drives sprocket 122, fast on shaft 124. Mounted on shaft 124 is an eccentric 126 (Fig. 8) attached by arm 128 to lug 130 on the lower side of plate 132 which forms the sloping bottom of supply bin or hopper 134. Plate 132 is supported by steel angles 136 at its edges, and by steel straps 138 crosswise underneath it. This leaves plate 132 free to reciprocate under control of eccentric 126. Inasmuch as sprockets 112, 116, 118 and 122 are all of the same diameter, eccentric 126 will make one complete revolution, and plate 132 will make one back and forth stroke, each time crank shaft 48 makes a revolution. This device serves a very useful purpose in preventing arching of the freshly mixed concrete or other material 140 in supply hopper 134, and thus assuring that charging hopper 100 will be completely filled with material through the bottom opening of the bin each time before it moves forward over the mold.

Figure 17:
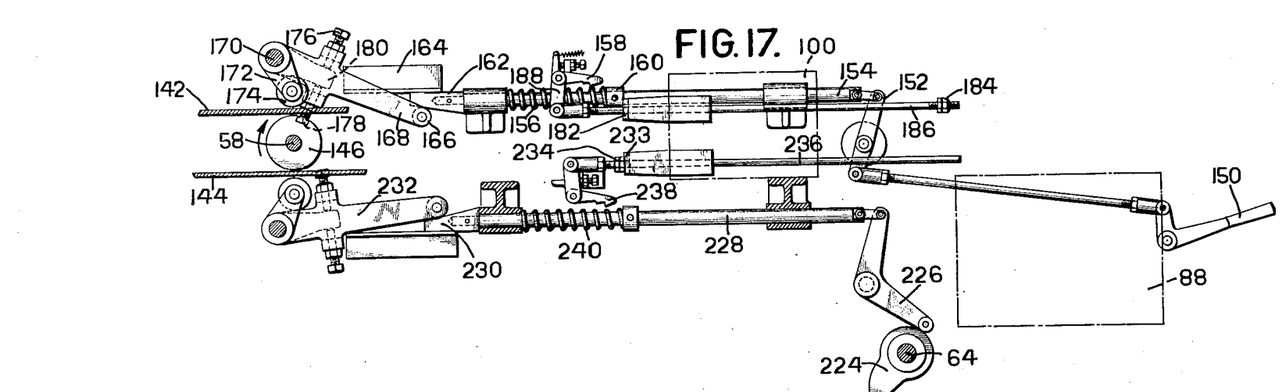
Fig. 17 shows details of the hopper-moving friction devices in normal position.

Pivotally attached at 141 to each charging hopper 100 and extending rearwardly therefrom (Fig. 8) are upper and lower friction plates 142 and 144 respectively. Plate 142 passes above, and plate 144 below, a roller 146 on constantly rotating shaft 58. The details of construction and method of operation of these devices may best be understood from Figs. 17 and 18. When hand lever 150 is depressed by the operator, the upper end of lever 152 moves to the left, pushing before it rod 154 against compression spring 156, until spring-actuated latch 158 engages the right hand side of collar 160 fast on rod 154. When rod 154 moves to the left, wedge 162 on the left end of the rod is forced between fixed block 164 and roller 166 on the free end of arm 168 which is fulcrumed on the frame at 170, thereby moving arm 168 downwardly and rotating shaft 170 clockwise. Fast on shaft 170 is a downwardly extending arm 172 provided at its lower end with a roller 174. When shaft 170 is rotated clockwise member 142 is pinched between rollers 146 and 174 and is propelled to the right by the friction between itself and roller 146 which rotates in the direction indicated by the arrow. Screws 176 and 178 in arm 168 acting on arm 180 serve to adjust arm 172 relatively to arm 168 in a manner readily apparent from the drawings.

Figure 18:
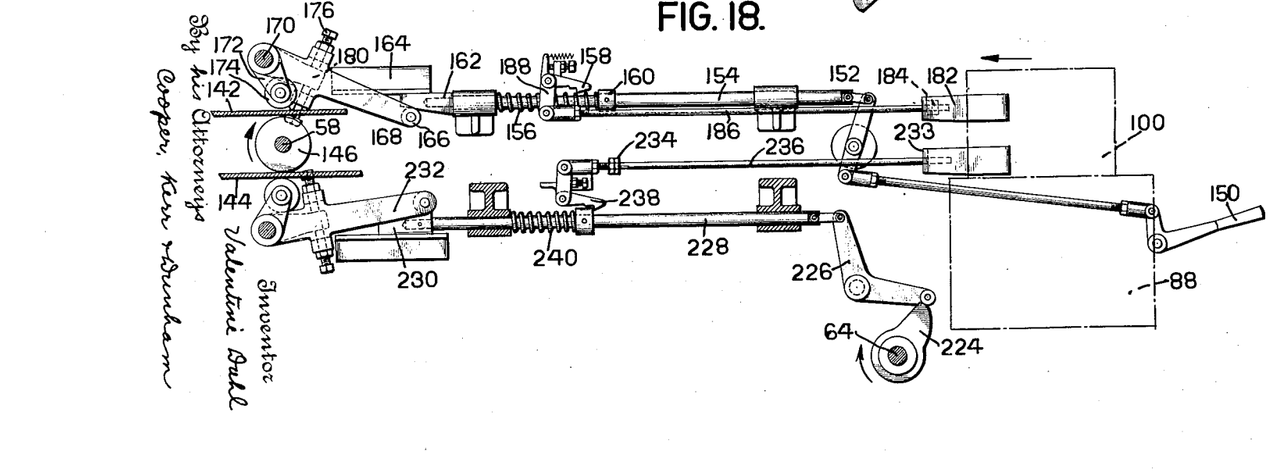
Fig. 18 shows details of the friction apparatus, the lower device being engaged and the hopper moving to the left.

Hopper 100 travels to the right until angle bracket 182 attached to the side of the hopper contacts with nuts 184 on rod 186 as in Fig. 18, whereupon rod 186 draws arm 188 to the right and frees latch 158 from collar 160, allowing spring 156 by means of rod 154 to withdraw wedge 162 and free member 142 from friction roller 146, thereby stopping hopper 100 at a predetermined spot above the mold.

When charging hopper 100 reaches the end of its forward stroke, an angle bracket 190 attached to the hopper (Fig. 9) contacts with an adjustable stop 192 on the upper end of bell crank 194, pivoted on the frame at 196, thereby rocking lever 194 about its pivot and, through link 198, drawing up the right hand end of clutch lever 200 which is fulcrumed on the frame at 202. Lever 200, by means of shoulder 201, normally holds pawl 204 out of engagement with ratchet 206 which is attached to the hub of sprocket 62. Pawl 204 is pivotally attached at 208 to disk 210, which in turn is fast to shaft 64. When shoulder 201 on lever 200 releases pawl 204, spring 212 draws the pawl into engagement with a tooth of rotating ratchet 206 thereby causing pawl 204, disk 210 and shaft 64 to rotate with the sprocket 62. As will later appear, by the time shaft 64 reaches the end of its first revolution, bracket 190 will have moved out of contact with stop 192 and thereupon lever 200, urged by spring 214, will again contact with pawl 204, draw it out of engagement with ratchet 206 and permit shaft 64 to again come to rest. The above described mechanism comprises a one-revolution clutch of well known type, therefore it calls for no further description.

The rim of disk 210 is corrugated for a portion of the circumference thereof as indicated at 216. Associated with disk 210 and attached thereto is a supplemental disk 218 (Fig. 11) which is corrugated in a manner similar to disk 210. Corrugations 216 are utilized to vibrate the mold and charging hopper during the revolution of shaft 64, and the above arrangement of disks provides a convenient means for varying the arc during which vibration takes place. If disk 218 is located with reference to disk 210 so that the two sets of corrugations correspond, then vibration will occur only during the arc covered by the corrugations of disk 210. If, however, disk 218 is angularly shifted relatively to disk 210 the effective corrugated circumference of the combined disks will be increased and the vibration period increased accordingly.

Figure 9:
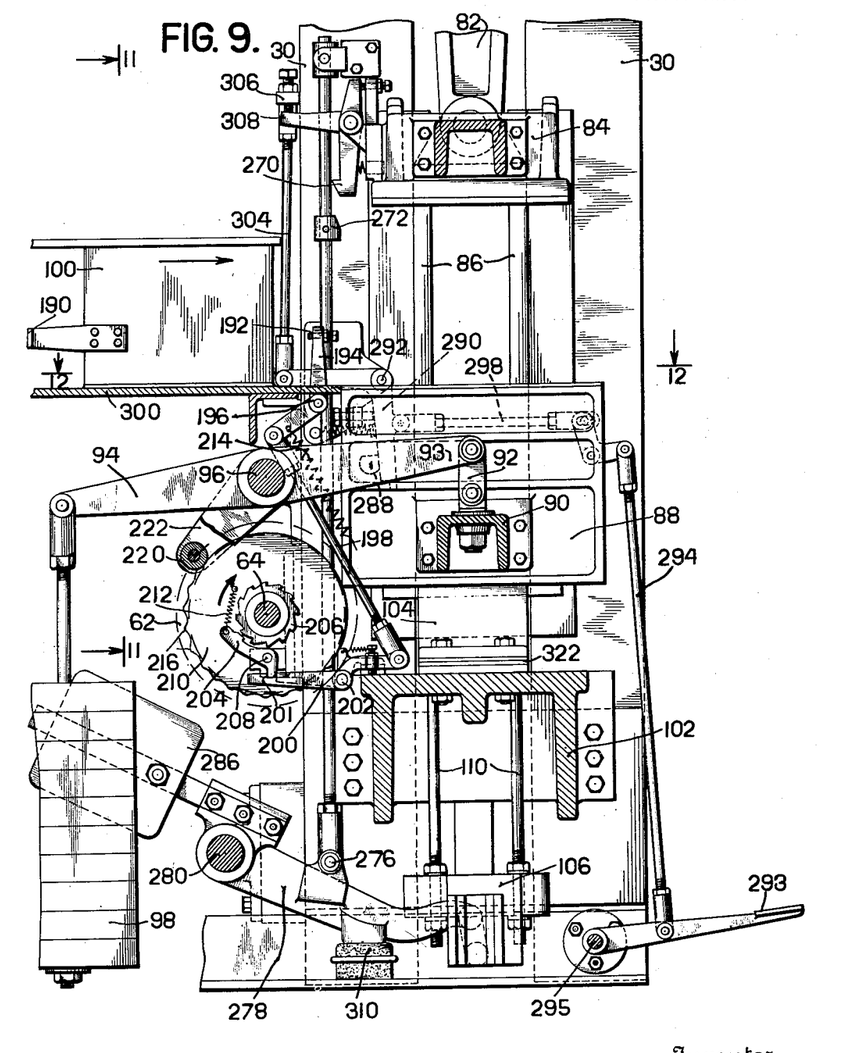
Fig. 9 is an enlarged sectional view on the line 9—9 of Fig. 6, showing the mold in its up-position, the charging hopper moving forward to fill the mold, the ejector in its down-position, the ram up, and the vibrator in normal position ready to begin operation.
Figure 11:
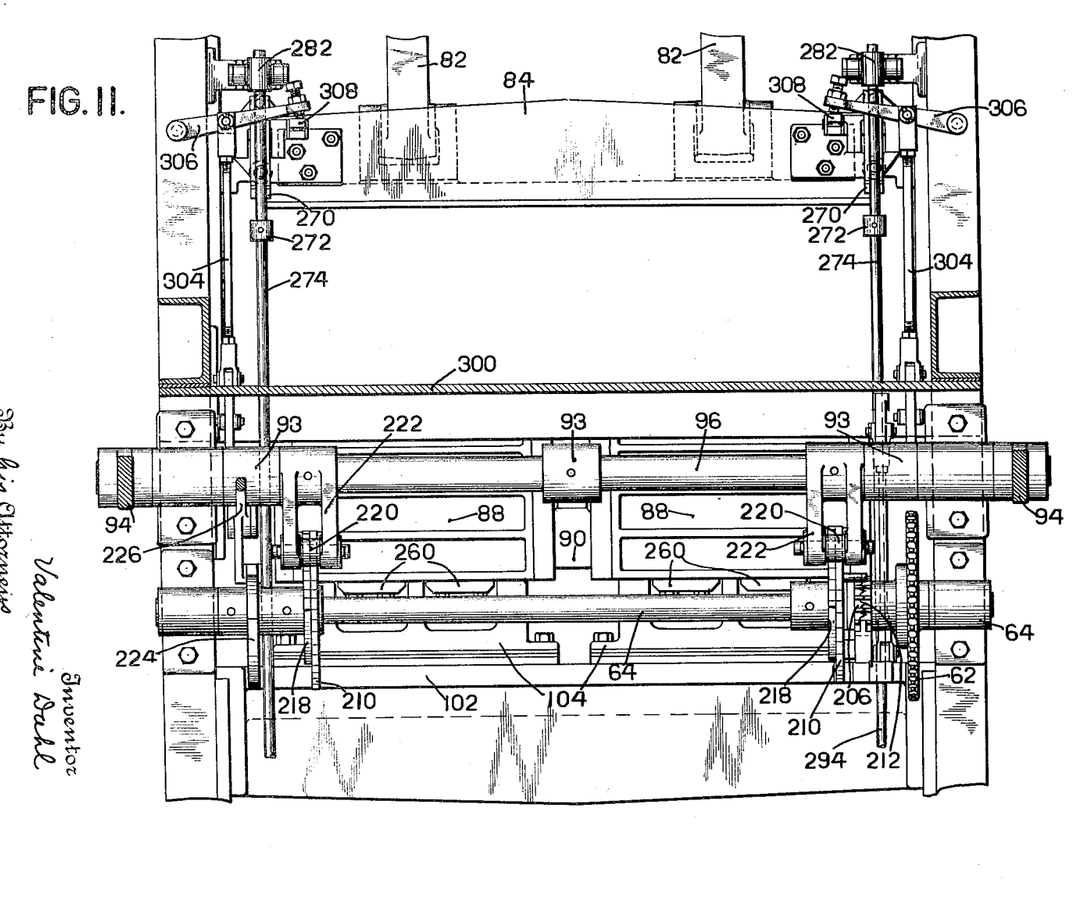
Fig. 11 is a rear view of a portion of the machine, on the line 11—11 of Fig. 9.

There is a pair of disks 210—218 near each end of shaft 64 (Fig. 11). Resting on the rim of each pair of disks is a roller 220 on the end of an arm 222 (Fig. 9). Arms 222 are keyed to shaft 96 and are held in firm contact with the disks by counterweights 98 on the ends of arms 94.

Inasmuch as molds 88 are suspended from arms 93, it will be readily understood from the above that molds 88 and charging hopper 100 will be vibrated while corrugations 216 are passing under rollers 220. This vibration occurs while the parts are in the position shown in Fig. 2.

Fast on shaft 64 is a cam 224 (Figs. 11, 16, 17, 18). While shaft 64 is approaching the end of its revolution, cam 224 actuates bell crank 226 (Fig. 18) to move rod 228 to the left and cause wedge 230 to actuate lower gripper lever 232 thereby bringing lower plate 144 into engagement with the lower side of friction wheel 146 and moving charging hopper 100 to the left as indicated in Fig. 18. Rod 228 is held by latch 238 in the position to which it was pushed by cam 224 until angle bracket 233 contacts with nuts 234 on rod 236 (Fig. 17), whereupon latch 238 is disengaged, rod 228 and wedge 230 move to the right impelled by spring 240, and plate 144 is disengaged from roller 146, leaving charging hopper 100 standing underneath supply hopper 134, ready to be again filled with concrete.

Extending rearwardly from the top of charging hopper 100 is a flat plate 242 (Fig. 8) which serves to seal the discharge opening of supply hopper 134 whenever hopper 100 is not in position thereunder. Underneath hopper 100 is a plate 300 upon which the hopper slides.

Figures 4, 5:
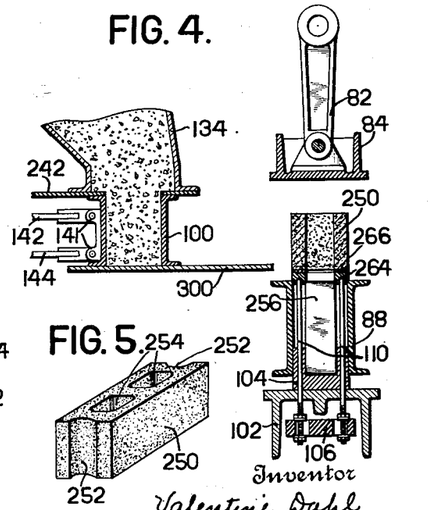
Fig. 4 shows the block after it has been raised from the mold by the ejector, in position to be removed from the machine.
Fig. 5 is a perspective view of the block used for illustrative purposes in this specification.
Figure 12:
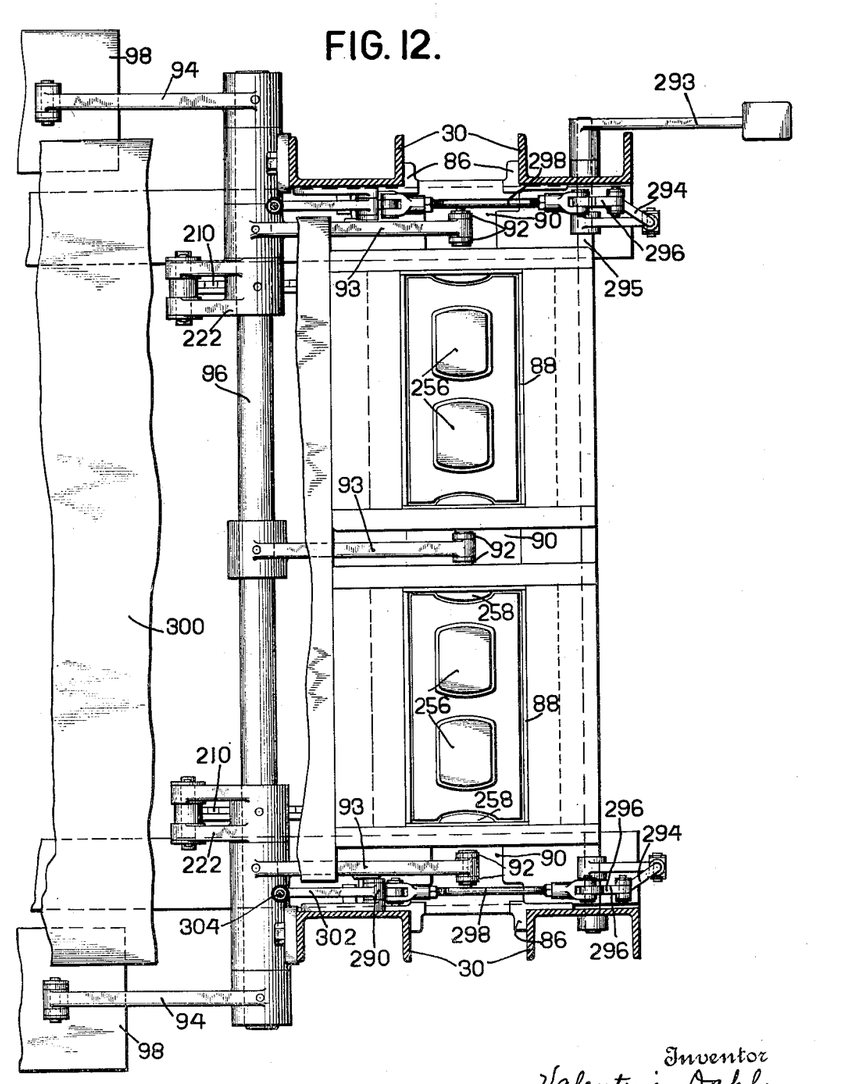
Fig. 12 is a sectional plan view on the line 12—12 of Fig. 9.

The machine herein illustrated is arranged to make a block 250 as shown in Fig. 5. This block has a vertical recess 252 at each end, and two vertical cavities 254 through the body of the block. The construction of the mold suitable for making such a block may be understood from Figs. 12 and 13. Cavities 254 are formed by cores 256 and recesses 252 by cores 258. Cores 256 rest on, and are bolted to, cross bars 260 which are secured to the lower side of the mold, the tops of the cores being planed off flush with the top of the mold. Cores 258 are bolted to the ends of the molds. Cores 256 are tapered toward their upper ends, being smaller at their tops. This feature of the upwardly tapered cores is very important from the standpoint of the quality of the finished product, as will appear from the following discussion.

Figure 2:
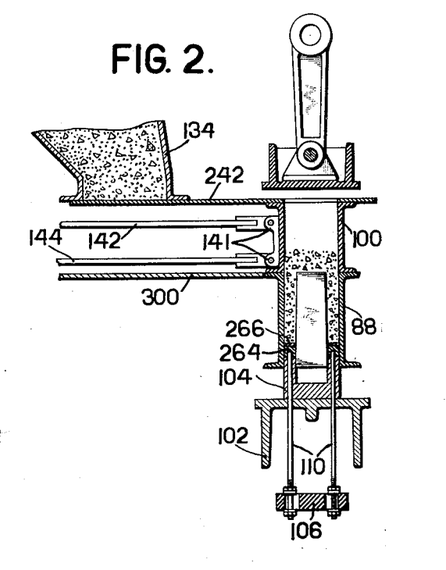
Fig. 2 is a diagrammatic view in section, showing the charging hopper in position over the mold. While in this position the mold and hopper are vibrated.

The mold is filled by gravity from above, as will be clear from Fig. 2. The fact that the space provided in the mold for the concrete is wider at the top than at the bottom enables the fresh plastic material to flow freely into the mold. The filling of the mold is of course aided by the vibration of the mold and charging hopper during the filling operation. However, after the mold is filled as above, the material must be compressed in order to provide a block of proper density. It has been found that if the material be compressed by a plunger entering the mold from the top to press the material downwardly from the larger end of the mold cavity toward the smaller end of the mold cavity, good results cannot be obtained. The inwardly inclined walls of the narrow cavity offer such frictional resistance as to prevent the full intensity of the plunger pressure being transmitted to the bottom of the material in the mold, and therefore the density of the product will not be uniform from top to bottom of the block, being more dense near the plunger and decreasing in density toward the more restricted part of the mold cavity.

To overcome that difficulty the present machine is arranged to compress the block from the bottom of the mold instead of from the top. The compression plunger enters the narrow end of the mold cavity and presses upwardly toward the wider part of the mold, thereby permitting the plunger pressure to be distributed with substantial uniformity throughout the material in the mold with the result that a block of uniform density is produced. The method of carrying out the above idea will now be described.

Figure 13:
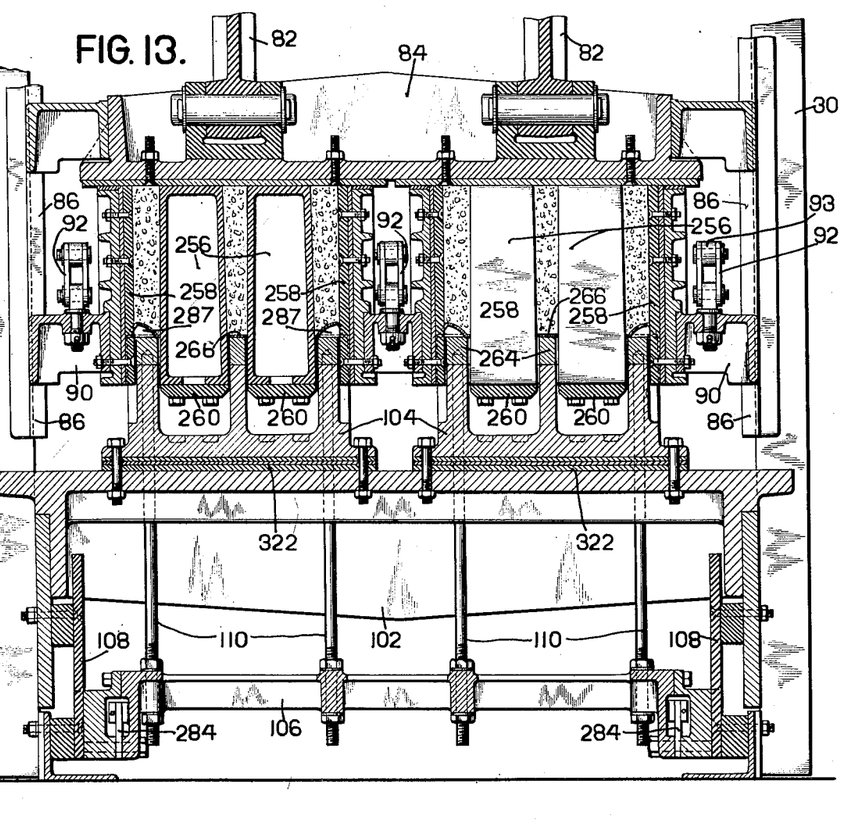
Fig. 13 is an enlarged sectional view of the loaded mold at the instant the ram begins to push the mold downwardly to compress its contents between the ram and the plunger.
Figure 14:
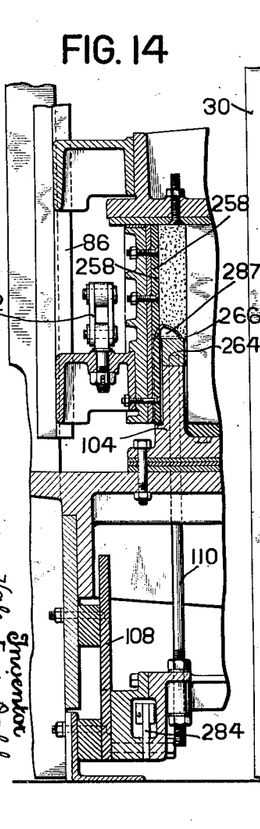
Fig. 14 is a view of a portion of Fig. 13 after the ram has descended.

Mounted on member 102 is a plunger 104 projecting upwardly into the open bottom of the mold as shown in Fig. 13. Resting on top of plunger 104 is a plate 264 surrounding the cores and slidable vertically within the cavity of the mold. The under side of plate 264 is counter-bored to receive the upper ends of the four ejector rods 110. On top of plate 264 is placed the steel platen or pallet 266 upon which the block is formed and upon which the finished block is removed from the machine.

Figure 3:
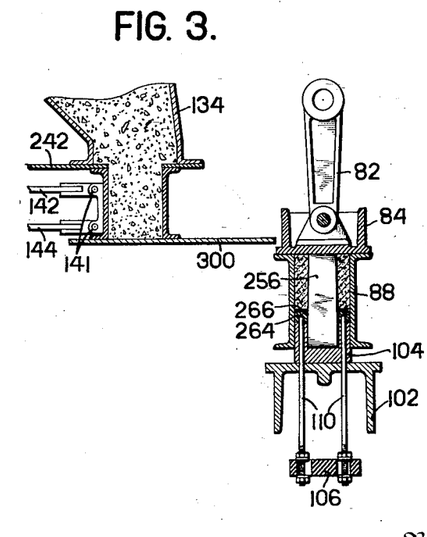
Fig. 3 shows the charging hopper returned to its normal position and the ram pushing the filled mold downwardly, thereby compressing the contents of the mold between the ram above and plunger below.

After the mold has been filled with plastic material and the charging hopper has returned to normal position the operator draws down lever 74 thereby causing crank shaft 48 to make one revolution as described. This results in ram 84 descending on the top of the mold and forcing it downward as shown in Fig. 3. Inasmuch as member 102 is stationary the downward motion of the mold causes the contents of the mold to be compressed from the bottom upwardly by plate 264 which serves as the working face of plunger 104.

On the downward stroke of ram 84 the block is compressed. On the following upstroke of the ram the block is automatically removed from the mold, as follows.

On the rear of the ram near each end thereof is a spring-actuated latch 270 (Figs. 10, 11) which, when the ram reaches the bottom of its stroke engages collar 272 on vertical rod 274.

The lower ends of rods 274 are connected at 276 to levers 278, pivoted at 280, the upper ends of the rods being guided by bearings 282 fast to the frame. The free end of each lever 278 is connected by link 284 to ejector frame 106. The opposite end of each lever 278 is provided with a counter-weight 286.

The mold-supporting arms 93 at the ends of the machine are each provided with a stop pin 288. When the molds are at the bottom of their stroke each stop pin 288 is engaged by the lower end of a spring-actuated bell-crank latch 290 pivoted on the frame at 292. Latch 290 prevents the molds from following ram 84 upwardly to assume their normal position until released by the operator, as will appear.

While the mold is latched down, crank shaft 48 continues to revolve, raising ram 84 to its normal position at the top of its stroke. On that up-stroke of the ram, rods 274 are drawn up by latches 270, rotating levers 278 about their fulcrums 280 and, through links 284, raising ejector frame 106, ejector rods 110, plate 264, and platen 266, thereby ejecting the newly formed block upwardly from the mold.

Figure 10:
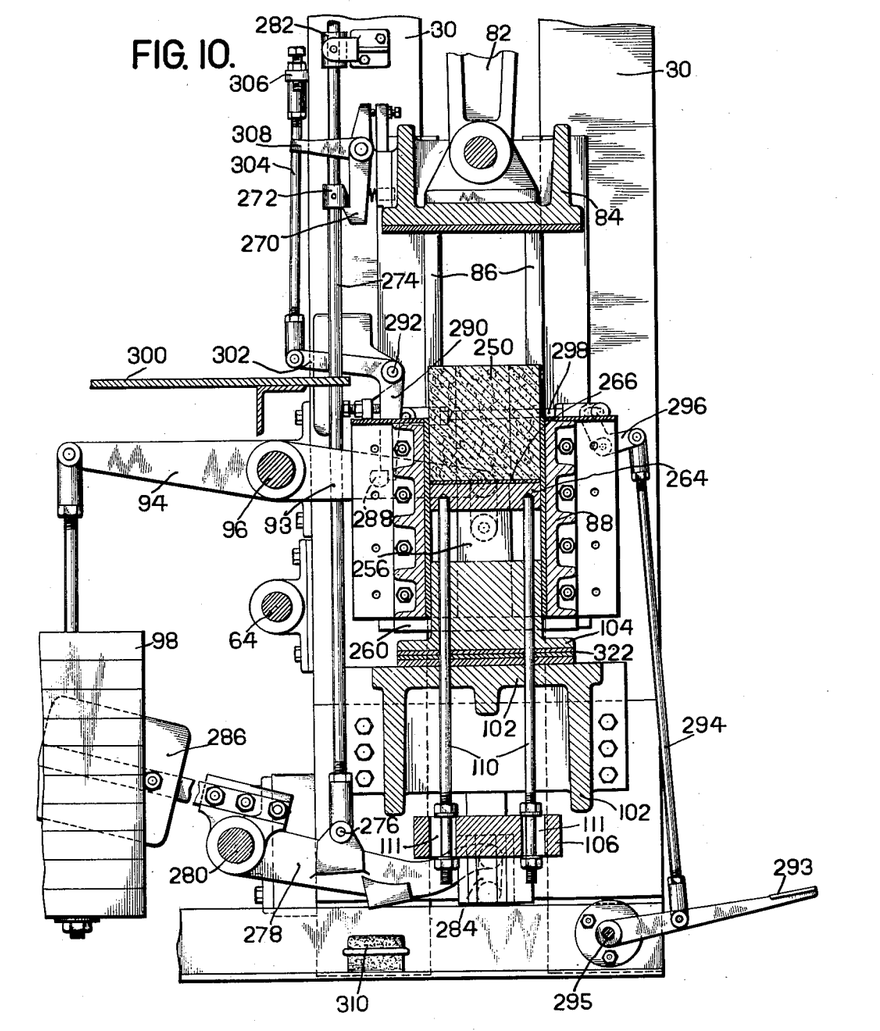
Fig. 10 is an enlarged sectional view on the line 10—10 of Fig. 6, showing the operation at a later stage than in Fig. 9, the mold being in down-position, the ram moving up, and the block being raised from the mold by the ejector.

The ejection operation is shown under way in Fig. 10 and completed in Fig. 4. The operator then removes the block, on its platen, to the drying racks. The platen is usually provided with upwardly curved ends as at 287 (Fig. 13) to serve as convenient handles for the operator.

A swinging table 291 is provided (Fig. 8) at proper height to assist the operator in easily moving the block and its platen from the machine.

After the block has been removed the operator depresses pedal 293, rocking shaft 295 and drawing down rods 294, to rock bell cranks 296 thereby, through horizontal link 298, disengaging latches 290 from stops 288. This permits counter-weights 98 to raise the molds to normal position flush with the top of plate 300 upon which charging hopper 100 slides.

When latch 290 is actuated as above, the horizontal arm 302 thereof draws down link 304, which in turn draws down arm 306 (Figs. 10 and 11) which depresses horizontal arm 308 of latch 270 thereby releasing latch 270 from collar 272 and permitting the ejector mechanism to drop to normal position against the resistance of counter-weight 286 which serves to lessen the impact of levers 278 on rubber bumpers 310.

Figure 1:
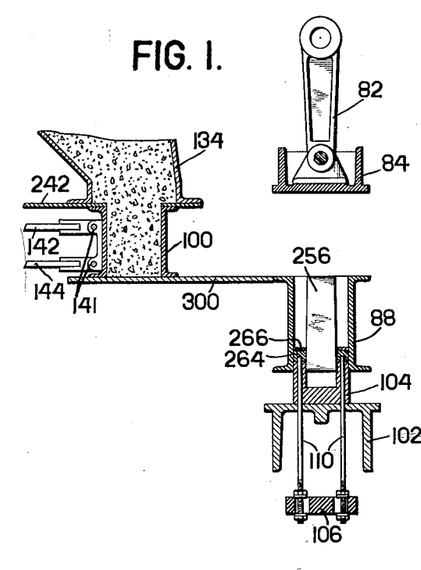
Fig. 1 is a diagrammatic view in section, showing the charging hopper loaded and ready to move forward over the mold and under the ram.

This completes the cycle of operation of the machine, which is again in the position shown in Fig. 1, ready to begin the manufacture of another block.

The cycle described in detail above may be stated briefly as follows. With the motor and shafts 38, 58 and 64 running, the operator depresses lever 150, whereupon charging hopper 100 moves forward to a position over mold 88 and fills the mold. While the charging hopper is resting on the mold they are vibrated to insure proper filling of the mold. After the vibrating operation is completed the charging hopper is automatically returned to normal position, under the supply hopper, taking back with it any material not left in the mold. The operator then depresses lever 74, thereby causing crank shaft 48 to make one revolution, which results in ram 84 forcing the mold and contents downwardly. During the downward stroke of the mold its contents are compressed upwardly by the stationary plunger. The mold is latched at the lowest point of its travel, and the ram on its up-stroke actuates the ejector mechanism to force the finished block out of the top of the mold. After the operator removes the block, on its platen, he depresses foot lever 293 whereupon the mold rises to normal position and the ejector device falls to normal position and the cycle of operation of the machine is complete.

Figure 15:
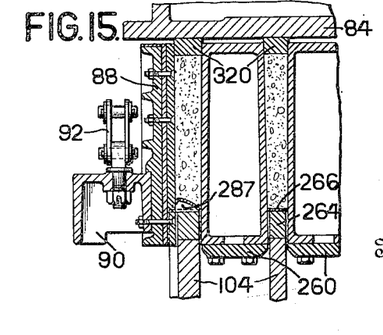
Fig. 15 is a sectional view of the mold in the same position as in Fig. 13 but with the addition of an "initial compression" plate on the ram.
Figure 16:
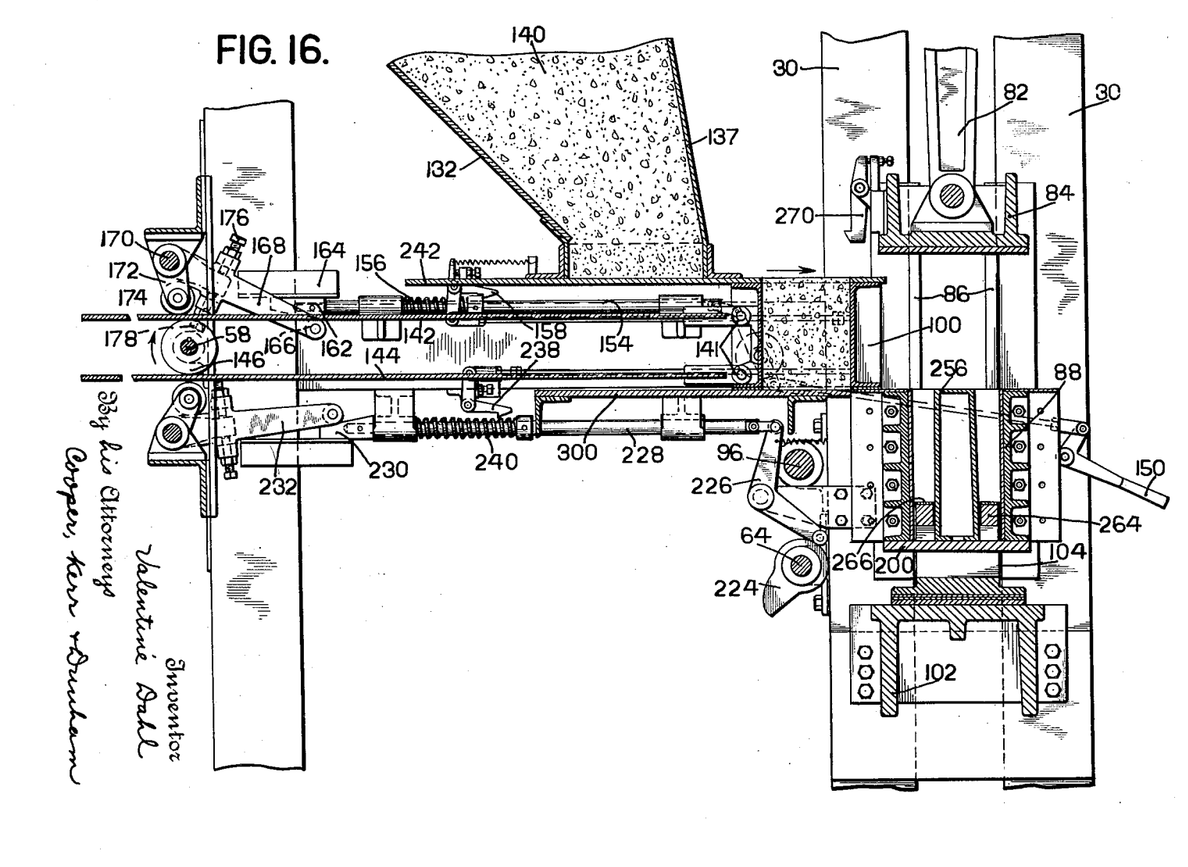
Fig. 16 is an enlarged sectional view of the loading device with the upper friction device engaged and the charging hopper moving forward.

It sometimes happens that a block is desired having a greater localized density at one surface than throughout the balance of the block. This is accomplished by providing ram 84 with a compression plate 320 so located and shaped as to enter the upper end of the mold cavity (Fig. 15). As already explained, any attempt to compress the material from the under end of the mold cavity toward the narrower end thereof results in localized density at the end where the pressure is applied. The arrangement shown in the drawing produces a block having the usual density due to plunger 104 applied from the bottom, and an increased density at its upper face due to compressor plate 320.

To vary the height of the block or degree of compression thereof the vertical location of plungers 104 may be changed by means of shims 322 placed underneath them on member 102 (Fig. 13).

It is to be understood that the invention is not limited to the specific construction herein illustrated and described but can be embodied in other forms without departure from its spirit as defined by the following claims.

I claim:—

1. In a machine of the class described, in combination, a charging hopper, a mold, means for moving said hopper to a position in which it rests on said mold, means effective automatically when the hopper reaches said position for vibrating said mold and said hopper, and means effective automatically when the vibration operation is completed for removing said hopper from said mold.

2. In a machine of the class described, in combination, a charging hopper, a mold, means for moving said hopper to a position in which it rests on said mold, means effective automatically when the hopper reaches said position for vibrating said mold and said hopper, means effective automatically when the vibration operation is completed for removing said hopper from said mold, and means for automatically stopping the operation of the vibrating means when the hopper has been removed.

3. In a machine of the class described, in combination, a charging hopper, a mold, means for moving said hopper to a position in which it rests on said mold, means for thereupon vibrating said mold and said hopper, and means for adjusting the duration of said vibrating action.

4. The invention set forth in claim 3, in which said vibrating means comprises a pair of adjacent disks each corrugated around a portion of its circumference, and means for adjusting said disks angularly relatively to each other in order to vary the total circumferential extent of the corrugations on the two disks substantially as described.

5. In a machine of the class described, in combination, a charging hopper, a mold, means for moving said hopper to a position in which it rests on said mold, means effective automatically when the hopper reaches said position for vibrating said mold and said hopper, and means effective automatically upon completion of the vibrating operation for removing said hopper from its position on said mold.

6. In a machine of the class described, in combination, a charging hopper having a normal position, a mold, means for moving said hopper from normal position to a position on said mold, said moving means including a rearwardly extending member pivotally attached to said hopper, and means comprising another rearwardly extending member pivotally attached to said hopper for returning said hopper to its normal position.

7. The invention set forth in claim 6, in which said rearwardly extending members are actuated by a friction device arranged to selectively engage one or the other of said members.

8. The invention set forth in claim 6, in which said rearwardly extending members are parallel with each other, a continuously running friction roller is located between said members, and means are provided for forcing one or the other of said members into contact with said roller.

9. In a machine of the class described, in combination, a charging hopper having a normal position, a mold, means for moving said hopper from normal position to a position on said mold, said moving means including a pair of rearwardly extending parallel friction plates, a rotating friction roller between said plates, means for forcing one of said plates into contact with said roller to drive said hopper from its normal position to a position resting on said mold, means effective automatically when the hopper reaches said latter position for vibrating said mold and hopper for a predetermined period, and means effective automatically when the vibration is completed for forcing the other friction plate into contact with said roller whereby the hopper will be returned to normal position.

10. In a machine of the class described, in combination, a mold having a normal position and a depressed position and adapted to contain plastic material, a ram, means for imparting a down-stroke and return stroke to said ram, said ram on its down-stroke moving said mold from normal to depressed position to effect compression of the material contained therein to form a block, means for latching the mold in depressed position, and a device effective on the return stroke of the ram for ejecting the block upwardly from the mold.

11. In a machine of the class described, in combination, a mold having a normal position and a depressed position and adapted to contain plastic material, a ram, means for imparting a down-stroke and return stroke to said ram, said ram on its down-stroke moving said mold from normal to depressed position to effect compression of the material contained therein to form a block, means for latching the mold in depressed position, means for unlatching the mold, and means for thereupon restoring the mold to normal position.

12. The invention set forth in claim 11, in which said restoring means comprises a counter-weight operatively connected to the mold.

13. The invention set forth in claim 10, in which means is provided for forcing the ejector to normal position and in which means is provided to lessen the impact when the ejector reaches said normal position.

14. The invention set forth in claim 10, in which means is provided for forcing the ejector to normal position and in which means is provided to lessen the impact when the ejector reaches said normal position, said impact lessening means comprising a counter-weight to lessen the restoring force, together with a resilient device with which said ejector contacts when it is in normal position.

15. In a machine of the class described, in combination, a mold open top and bottom and adapted to contain plastic material, a plunger adapted to enter the bottom of said mold, means for forcing the mold down against the plunger to form a compressed block of plastic material in the mold, means for latching the mold in its down-position, means operable while the mold is in said position for ejecting the block upwardly through the top of the mold, and means for simultaneously restoring the mold and ejecting means to their initial positions.

In testimony whereof I hereto affix my signature.

VALENTINE DAHL.